United States Patent [19]

Smith

[11] Patent Number: 5,570,960

[45] Date of Patent: *Nov. 5, 1996

[54] APPARATUS FOR DISPENSING MONEY ORDERS

[75] Inventor: Lawrence G. Smith, Orlando, Fla.

[73] Assignee: Travelers Express Company, Inc., Minneapolis, Minn.

[ * ] Notice: The term of this patent shall not extend beyond the expiration date of Pat. No. 5,492,423.

[21] Appl. No.: 466,415

[22] Filed: Jun. 6, 1995

Related U.S. Application Data

[63] Continuation of Ser. No. 404,134, Mar. 13, 1995, Pat. No. 5,492,423, which is a continuation of Ser. No. 151,060, Nov. 12, 1993, abandoned, which is a continuation of Ser. No. 933,869, Aug. 21, 1992, abandoned, which is a continuation of Ser. No. 814,039, Dec. 24, 1991, abandoned, which is a continuation of Ser. No. 494,665, Mar. 16, 1990, abandoned, which is a continuation of Ser. No. 406,979, Sep. 13, 1989, abandoned, which is a continuation of Ser. No. 121,074, Nov. 16, 1987, Pat. No. 4,870,596, which is a continuation of Ser. No. 60,762, Jun. 8, 1987, Pat. No. 4,812,986, which is a division of Ser. No. 877,539, Oct. 31, 1986, Pat. No. 4,699,532, which is a division of Ser. No. 596,291, Apr. 3, 1984, Pat. No. 4,625,275.

[51] Int. Cl.$^6$ ............................................. B41J 21/16
[52] U.S. Cl. ..................... 400/74; 400/279; 400/693; 400/708; 395/111
[58] Field of Search .................................. 400/43, 54, 70, 400/73, 279, 582, 708, 693, 74; 283/74, 58; 226/27; 235/379; 101/19, 66, 93.05, 93.08, 93.24; 395/111

[56] References Cited

U.S. PATENT DOCUMENTS 2,071,141  2/1937  Placke .
3,722,405  3/1973  Mahoney et al. .

(List continued on next page.)

FOREIGN PATENT DOCUMENTS 0189124  7/1986  European Pat. Off. .
1265286  5/1961  France .

OTHER PUBLICATIONS

"NTN Supermarket Payment Services," National Transaction Network, Inc., 1990.
"The NTN Convenient Cash Machine," National Transaction Network, Inc., 1990.
"NTN Stand–Beside Supermarket Payment Solutions," National Transaction Network, Inc., 1990.
"NTN Integrated EFT Solutions for the IBM 4680 Store System," National Transaction Network, Inc., 1990.
"Micro–Max, an Integrated Financial Management System for Retail Petroleum Solutions," Schlumberger Technologies, 1990.
"T4300 Money Order Dispenser — Executive Manual," Standard Register Company, 1988.

(List continued on next page.)

*Primary Examiner*—John S. Hilten
*Attorney, Agent, or Firm*—Michael A. O'Neil

[57] ABSTRACT

A method and apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-eraseable programmable read only memory (E$^2$PROM) for storing a security inhibit printing code, this code being automatically changed to prevent actuation of the printer when the security of the dispenser is compromised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

3 Claims, 3 Drawing Sheets

U.S. PATENT DOCUMENTS

| | | |
|---|---|---|
| 3,757,685 | 9/1973 | Woodie et al. . |
| 3,814,227 | 6/1974 | Hurd III, et al. . |
| 3,848,798 | 11/1974 | Riley . |
| 3,931,761 | 1/1976 | Carrus et al. . |
| 3,970,992 | 7/1976 | Boothroyd . |
| 3,984,660 | 10/1976 | Oka et al. . |
| 3,997,763 | 12/1976 | Schasser . |
| 4,025,905 | 4/1977 | Gorgens . |
| 4,035,792 | 7/1977 | Price et al. . |
| 4,053,735 | 10/1977 | Foudos . |
| 4,082,945 | 4/1978 | van de Goor et al. . |
| 4,175,694 | 11/1979 | Donabin . |
| 4,224,779 | 9/1980 | Sano et al. . |
| 4,266,121 | 5/1981 | Hirose . |
| 4,270,042 | 5/1981 | Case . |
| 4,317,028 | 2/1982 | Simjian . |
| 4,321,671 | 3/1982 | Oshaka . |
| 4,341,951 | 7/1982 | Benton . |
| 4,355,369 | 10/1982 | Garvin . |
| 4,385,285 | 5/1983 | Horst et al. . |
| 4,417,137 | 11/1983 | Lundblad . |
| 4,441,713 | 11/1983 | Lundblad . |
| 4,463,939 | 8/1984 | Wantanabe . |
| 4,480,933 | 11/1984 | Shibayama et al. . |
| 4,494,127 | 1/1985 | King . |
| 4,501,224 | 2/1985 | Shibayama . |
| 4,523,330 | 6/1985 | Cain . |
| 4,545,695 | 10/1985 | Agata . |
| 4,572,946 | 2/1986 | Schrenk . |
| 4,591,404 | 5/1986 | Hamisch, Jr. .............................. 400/88 |
| 4,593,407 | 6/1986 | Konishi et al. . |
| 4,611,286 | 9/1986 | Nishimura et al. . |
| 4,624,588 | 11/1986 | Bivin . |
| 4,625,275 | 11/1986 | Smith . |
| 4,630,201 | 12/1986 | White . |
| 4,637,051 | 1/1987 | Clark . |
| 4,641,346 | 2/1987 | Clark et al. . |
| 4,641,347 | 2/1987 | Clark et al. . |
| 4,697,532 | 10/1987 | Smith . |
| 4,733,887 | 3/1988 | Mowry, Jr. . |
| 4,749,213 | 6/1988 | Mowry, Jr. . |
| 4,812,986 | 6/1988 | Smith . |
| 4,870,596 | 9/1989 | Smith . |
| 4,984,784 | 1/1990 | Smith . |
| 5,062,666 | 11/1991 | Mowry, Jr. . |

OTHER PUBLICATIONS

"Travelers Express Advertisement," Winter 1992.

"Automatic Money Order Dispenser," Model 1001, Entronics Corporation.

"Automatic Money Order Dispenser," American Express Information Services Corporation, 1990.

"The Automatic Money Order Dispenser," Indiana Financial Systems, Inc.—Brandt/Sharp Authorized Sales/Services, 1989.

"Series T4325 Money Order Dispenser," Standard Register, 1991.

"The Automatic Money Order Dispenser, Model 1001," Standard Register 1991.

"AMOD 2000 Automated Money Order Dispenser —User's Guide," American Express Information Services Corporation, Dec. 1990.

"AMOD 2000 Automated Money Order Dispenser —Manager's Guide," American Express Information Services Corporation, Dec. 1990.

"Series T4300 Money Order Dispenser," Standard Register Company, 1986.

"Series T4500 Official Items Disburser," Standard Register Company, 1986.

APPARATUS FOR DISPENSING MONEY ORDERS

This application is a continuation of prior application Ser. No. 08/404,134, filed on Mar. 13, 1995, now U.S. Pat. No. 5,492,423, entitled METHOD AND APPARATUS FOR DISPENSING MONEY ORDERS, which is a continuation of application Ser. No. 08/151,060, filed Nov. 12, 1993, now abandoned, which is a continuation of application Ser. No. 07/933,869, filed Aug. 21, 1992, now abandoned, which is a continuation of application Ser. No. 07/814,039, filed Dec. 24, 1991, now abandoned, which is a continuation of application Ser. No. 07/494,665, filed Mar. 16, 1990, now abandoned, which is a continuation of application Ser. No. 07/406,979, filed Sep. 13, 1989, now abandoned, which is a continuation of application Ser. No. 07/121,074, filed Nov. 16, 1987, now issued as U.S. Pat. No. 4,870,596, which is a continuation of application Ser. No. 07/060,762, filed Jun. 8, 1987, now issued as U.S. Pat. No. 4,812,986, which is a division of application Ser. No. 06/877,539 filed on Oct. 31, 1986, now U.S. Pat. No. 4,699,532, which is a division of application Ser. No. 06/596,291, filed Apr. 3, 1984, now U.S. Pat. No. 4,625,275.

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vendor portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser combersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overall operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programmable read only memory ($E^2PROM$). This $E^2PROM$ stores a security inhibit printing code which must be "recognized" by a printer software routine to enable the dot matrix printer. Each dispenser further stores a control software routine which operates to change or erase the security inhibit printing code stored in the $E^2PROM$ when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order in a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the $E^2PROM$ associated with each processor.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
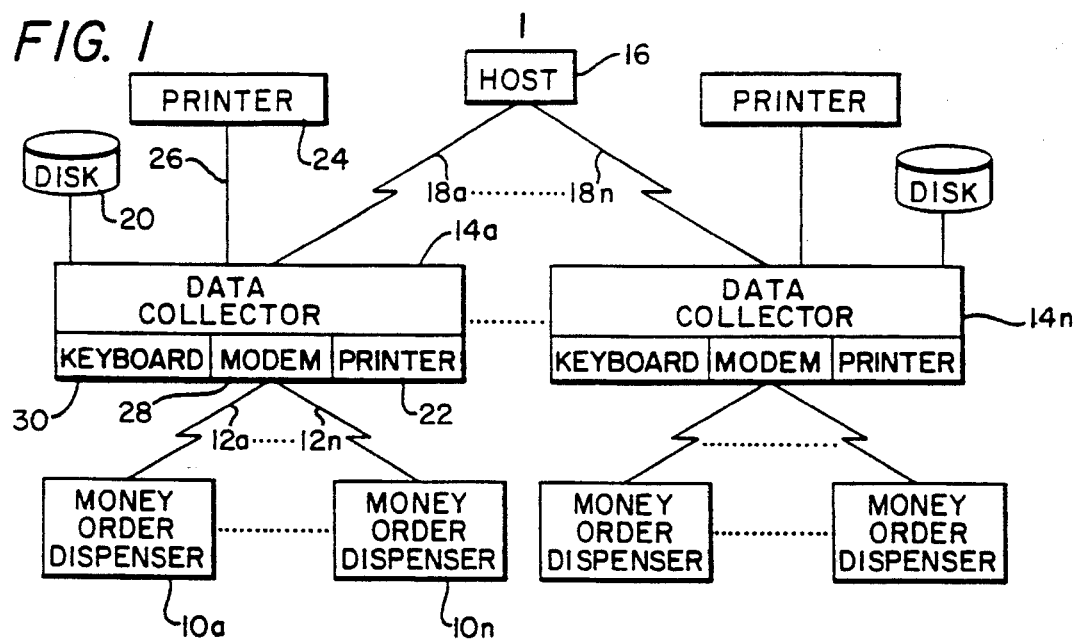
FIG. 1 is a block diagram of a desired system configuration incorporating a plurality of money order dispensers connected to one or more data collector devices, which are in turn connected to a host device.

With reference now to the FIGURES wherein like reference characters designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a–10n on a time-shared basis. In the preferred embodiment, a plurality of data collectors 14a–14n are connected to a host device 16 through communications links 18a–18n. Each communications link 18 is either a Modem Link or an RS232 serial full-duplex interface for direct connection to the host device 16. Alternately, the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a–10n. Data collector 14a also includes an internal printer 22 for printing this transaction information, although alternately, an external printer 24 is used for this purpose through an RS232 serial link 26. An internal modem 28 is also provided for direct communications to the money order dispensers 10a–10n over the communications links 12a–12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator vets limits on the following variables listed in TABLE I:

TABLE I

| VARIABLE NAME | DEFINITION |
| --- | --- |
| [-MCH MO# XXXXX-] | Total number of money orders to be printed before dispenser must be reauthorized |
| [-MCH MO# XXXXXXX-] | Maximum money order dollar amount to be issued before dispenser must be reauthorized |
| [-CST MO$ XXXXX.XX-] | Maximum dollar value per money order per customer |
| [-MCH CK# XXXXX-] | Maximum number of vendor payments which may be printed before dispenser must be reauthorized |
| [-MCH CK# XXXXX.XX-] | Maximum vendor payment dollar amount which can be issued before dispenser must be reauthorized |
| [-CST MO# XXXX-] | Maximum number of money orders which can be printed per customer |
| [-VND CK# XXXX-] | Maximum number of vendor payments which can be printed per vendor |
| [-VND CK# XXXXX.XX-] | Maximum dollar amount per vendor payment |
| [-WARN-# BLANKS XX-] | Number of blank money orders left in dispenser when warning issued |
| [-WARN-# TRANS XX-] | Amount of transaction storage left in dispenser memory when warning is issued |
| [-LOCK # ERRORS XX-] | Number of errors allowed before dispenser locks. |

As used throughout the remainder of the specification, the above limits and codes are referred to as "control" data. This control data is transmitted to the various money order devices 10a–10n located at the plurality of retail establishments.

Preferably, each of the other data collectors 14 shown in FIG. 1 include the same type of peripheral devices associated with the data collector 14a. The data collectors 14a–14n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invention is capable of fully independent stand-alone operation, as well as a direct on-line connection to a point-of-sale system.

Figure 2:
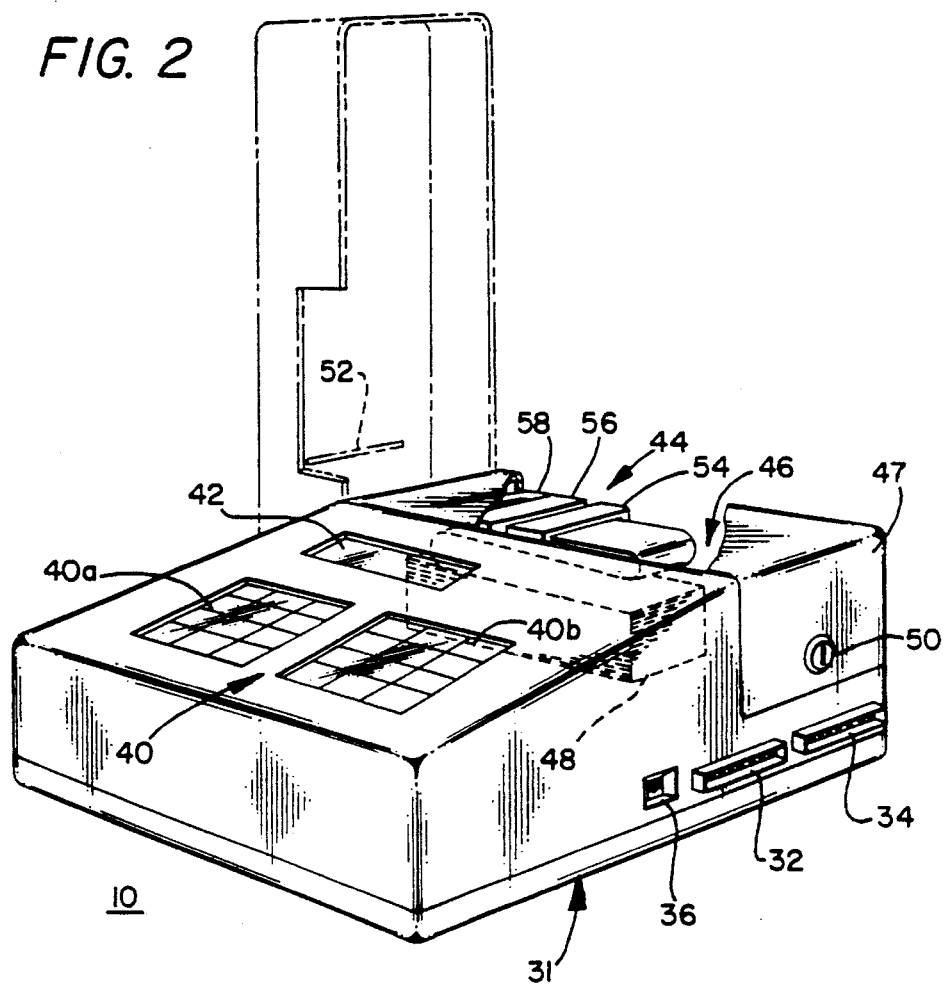
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retail establishment by appropriate securing means. The dispenser 10 is designed to be operable from 115 volts a.c. power, or d.c. power from an appropriate point-of-sale system. The power options are selectable by an internal selection switch (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen in FIG. 2, the storage compartment cover 47 includes an output throat 52 through which the printed money orders are dispensed. To effect printing of a money order, the dot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means is required since normal printing of the indicia would render the money order unreadable due to the transverse feed. Accordingly, a printer software routine to be described is provided for controlling the printer to produce readable alphanumeric indicia on the printed money orders.

Figures 3, 4:
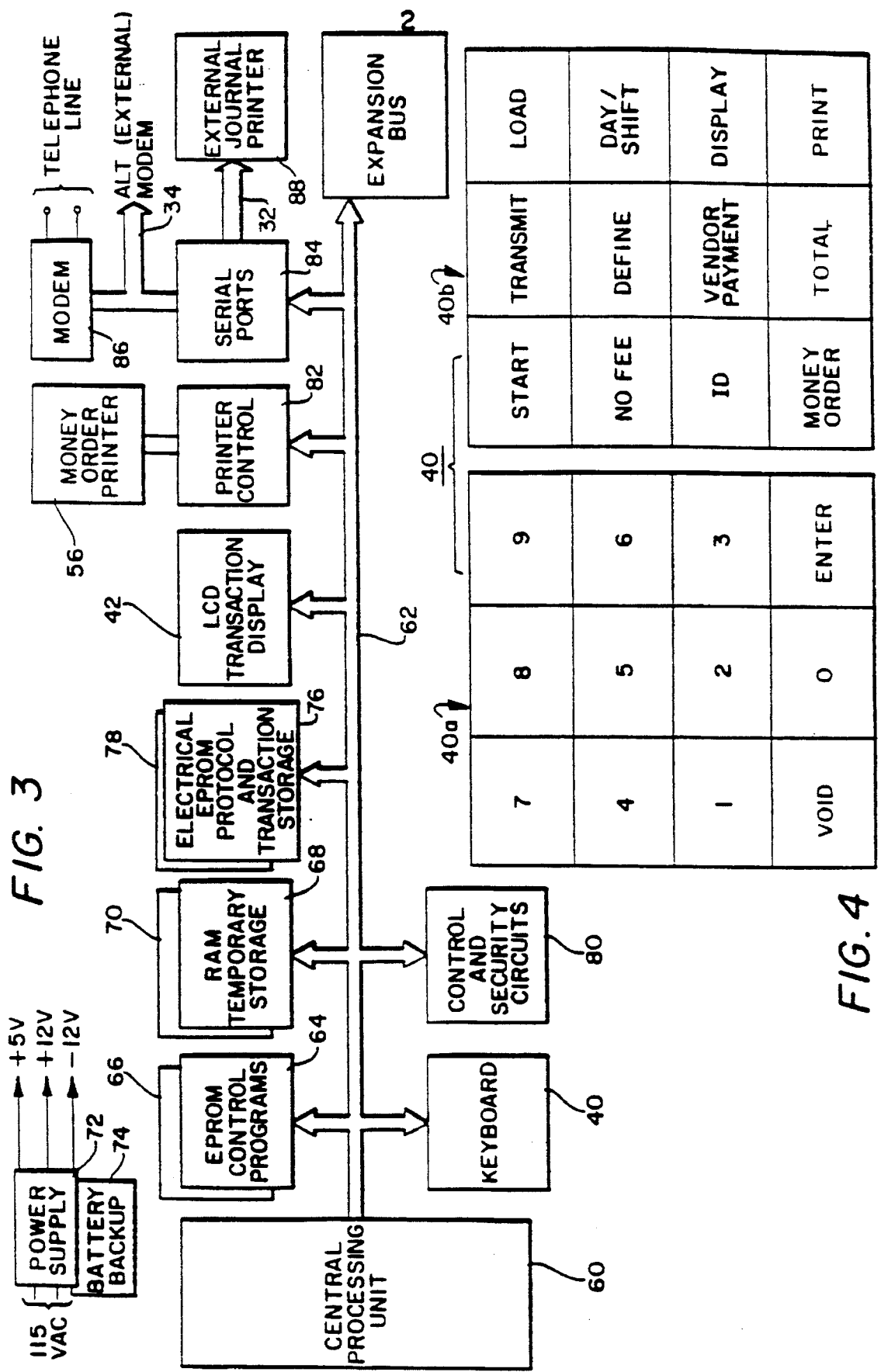
FIG. 3 is a block diagram of the electronic hardware incorporated in the money order dispenser of FIG. 2.
FIG. 4 is a representation of the preferred embodiment of the keyboard used in the money order dispenser of FIG. 2.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM'S 64 and 66 are connected to the CPU 60 by the bus 62. As also seen in FIG. 3, the money order dispenser 10 includes random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power be suddenly interrupted to the dispenser 10.

The money order dispenser 10 further includes a pair of electrically-eraseable programmable read only memories ($E^2PROM$'s) or equivalent semi-permanent memory device such as a battery support RAM, 76 and 78 connected to the CPU 60 by the bus 62. The $E^2PROM$ 76 is provided for storing various communication protocols utilized by the money order dispenser. In particular, the $E^2PROM$ 76 supports the NCR foreign attachment protocol, MSI special protocol, SDLC protocol and IBM 3680 store system interface. Additional protocols may be down-loaded into the $E^2PROM$ 76 by the data collector as required. Data and control codes for the above protocols are well known in the prior art and a description thereof is unnecessary for a complete understanding of the present invention.

According to a feature of the present invention, the $E^2PROM$ 78 is provided to store the transaction data for between 500–2000 vendor/customer transactions. Moreover, the $E^2PROM$ 78 also stores a security inhibit printing code for the money order dispenser 10 for security purposes. The printer software routine for controlling the dot matrix printer 56 must "recognize" the security inhibit printing code resident in $E^2PROM$ 78 in order to operate the dot matrix printer 56. If the security of the money order dispenser is compromised in any way, a control software routine stored in EPROM 64 operates to change or erase the security inhibit printing code stored in the $E^2PROM$ 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromised" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, if a previously determined amount or number of money orders, or other system operator-imposed constraints, have been exceeded, or if no recent communications have taken place within authorized time limits.

A control and security circuit 80 is also provided and includes an internal clock for controlling the timing of the various circuits shown in FIG. 3, and also for defining the date and time information for the transaction data. As discussed above, the LCD display 42 is provided for displaying this transaction data as well as system messages. The display software stored in EPROM 66 also disables the display if the dispenser is not in use for a period of time, and controls the display to indicate when the $E^2PROM$ 78 is approximately filled with transaction data. The money order dispenser 10 will discontinue further issuance of money orders and notify the operator if the $E^2PROM$ 18 is full. According to the present invention, the transaction data is then transmitted to the respective data collector device of FIG. 1 before the money order dispenser 10 may again issue money orders. The use of the non-volatile reusable E²PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software routine. The money order dispenser 10 further includes serial ports 84, connected to the CPU 60 by the bus 62, for driving an internal modem 86, and the external journal printer 88 via an RS232 duplex link. As noted above, when the internal modem 86 is not used, the modem interface is brought to the RS232 connector jack 34 for an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"–"9" for entering control and transaction data, and a "VOID" and "ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys of the second section 40b. The following message is then displayed on the display 42:

[-SECURITY #-]

The security number is a five digit number and is not displayed. This number must be correctly entered by the vendor in order for the sequence to continue. After the security number has been entered and verified, a manual entry of a store identification number is required. Accordingly, the following store number message is displayed on the LCD display 42:

[-STXXXXXXXXXXXXXX-]

The store number may be 1–14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:

[-DATE XX/XX/XX-]

[-TIME XX:XX:XX-]

The Definition Mode sequence further continues with the following displays for entering of identification entries, money order fees, a phone number dialed automatically under certain conditions, and an "ID USE" code for money order and vendor payment transactions:

[-ID XXX-]

[-FEE XXX.XX, YY.YY-]

[-PHX-XXX-XXX-XXXX-]

[-ID USE X-]

Specifically, the system includes twenty money order fees where XXX.XX is the dollar breakpoint, and YY.YY is the fee charged for any money order greater than the previous money order and less than or equal to the present XXX.XX breakpoint. The "ID USE" code takes on the following possible values:

0 - No ID Number needs to be entered;

1 - All ID Numbers are entered at the start of the day only;

2 - A valid ID Number must be entered for each transaction.

Entering of the above code information at the money order dispenser, as well as the information in TABLE I at the data collector, constitutes the Definition Mode. Once the last enter key has been pressed at the dispenser, the display screen 42 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be displayed:

[-ID -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 40b is also depressed. Subsequently, a dollar amount for the money order is entered via the numeric keys of the first section 40a followed by depression of the "MONEY ORDER" key of section 40b. The "TOTAL" key of section 40b is then depressed if more than one money order is required to be printed. The fee for each money order is automatically added to the total. Finally, the "PRINT" key of section 40b is then depressed and the requested money order is printed by the dot matrix printer 56 as discussed above with respect to FIG. 2. Note that if the "VOID" key of section 40a is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40b is depressed followed by the "TOTAL" and "PRINT" keys as discussed above with respect to the issuance of a money order.

Under a "Load Mode", money order forms are loaded into the money order dispenser 10. This is accomplished by opening the money order storage compartment cover 47, depressing the "START" key and then a "LOAD" key of section 40b. Depression of these keys will produce the following sequential display messages:

[-SECURITY #-]
[-BEG #XXXXXXXX-]
[-END #XXXXXXXX-]

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40b. Upon depression of these keys, the following sequential display messages occur:

[-SECURITY #-]
[-DIAL TELEPHONE #-]

After entering of the security number and dialing the telephone number for connection to the appropriate data collector, the operator places the phone receiver in the modem. The "START" key is then depressed to cause the dispenser to transmit the stored transaction data in $E^2PROM$ 78 to the data collector. After transmission the following message is displayed to prompt the operator to disconnect the dispenser from the modem:

[-DISCONNECT RMOD-]

This constitutes the Transmission Mode. Once the last data is transmitted and a verification signal is received by the money order dispenser, the dispenser automatically terminates the connection, displays the above disconnect message and exits the Transmission Mode.

As discussed above, an important feature of the present invention is the use of the dot matrix printer 56 which is designed to receive a money order in a transverse direction with respect to the printing of normal indicia thereon. The movement of money orders through the dot matrix printer in a transverse fashion facilities the use of a small dot matrix printer, thereby reducing the overall dimensions of the money order dispenser of the present invention. However, since the money order is passed through the dot matrix printer in a transverse fashion, normal printing of indicia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Figure 5:
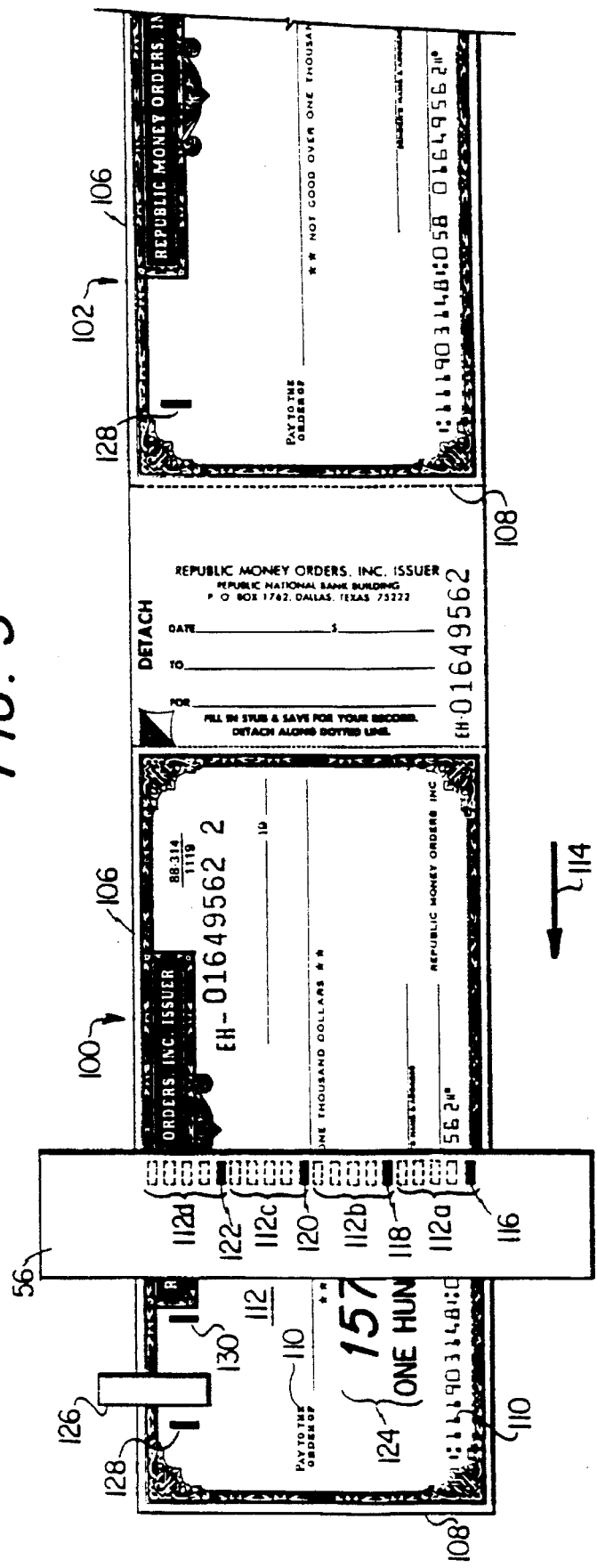
FIG. 5 is a top view of the dot matrix printer incorporated in the dispenser of FIG. 2 detailing the movement of a money order therethrough.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example elements 116, 118, 120 and 122, each of which reciprocate transversely to print alphanumeric indicia in four regions of the printing zone 112. Specifically, print element 116 moves transversely through the region 112a of the printing zone 112, print element 118 moves transversely through the printing zone 112b, etc.

Therefore, as seen in FIG. 5, the dot matrix printer 56 extends transversely across the printing zone 112 for printing variable alphanumeric indicia on the money order forms. It should be appreciated, however, that since the dot matrix printer normally prints indicia in a transverse direction, normal operation of the printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of the printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth in each of U.S. Pat. Nos. 5,492,423; 4,870,596; 4,812,986; 4,699,532; and 4,625,275; all incorporated by reference.

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

I claim:

1. An automatic money order dispenser for printing and dispensing money orders of the type having relatively long top and bottom edges and relatively short left and right side edges, and having alphanumeric indicia pre-printed thereon along lines extending substantially parallel to the top and bottom edges comprising:

a digital processor for controlling the operation of said dispenser;

a money order issuing path along which pre-printed money order forms travel with one of the side edges of each form positioned as a leading edge as the forms travel along the issuing path through the dispenser;

printing means extending entirely transversely across the money order issuing path and perpendicular to the top and bottom edges of the pre-printed money order forms for simultaneously printing variable alphanumeric indicia on the pre-printed money order forms on a plurality of lines extending substantially parallel to the top and bottom edges of the forms thereby forming completed money orders to be issued;

means for insuring the pre-printed money order forms are not counterfeit including means sensing at least one code mark on each pre-printed form, said means for insuring further including means determining whether the forms are properly located in the printing means before actuating the printing means;

an external housing enclosing the money order issuing path, the printing means and a compartment for storing pre-printed money order forms; and an opening in the housing for emitting completed money orders from the housing following printing by the printing means.

2. An automatic money order dispenser of claim 1 wherein the money order issuing path is adapted to receive pre-printed money order forms as a continuous series of forms having separation lines therebetween.

3. A system for printing and dispensing money orders of the type having relatively long top and bottom edges and relatively short left and right side edges, and having alphanumeric indicia pre-printed thereon along lines extending substantially parallel to the top and bottom edges at one or more retail establishments, including a data collector, comprising:

a plurality of money order dispensers each including:

a digital processor for controlling the operation of said dispenser;

a money order issuing path along which pre-printed money order forms travel with one of the side edges of each form positioned as a leading edge as the forms travel along the issuing path through the dispenser;

printing means extending entirely transversely across the money order issuing path and perpendicular to the top and bottom edges of the pre-printed money order forms for simultaneously printing variable alphanumeric indicia on the pre-printed money order forms on a plurality of lines extending substantially parallel to the top and bottom edges of the forms thereby forming completed money orders to be issued;

means for insuring the pre-printed money order forms are not counterfeit including means sensing at least one code mark on each pre-printed form, said means for insuring further including means determining whether the forms are properly located in the printing means before actuating the printing means;

an external housing enclosing the money order issuing path, the printing means and a compartment for storing pre-printed money order forms; and an opening in the housing for emitting completed money orders from the housing following printing by the printing means;

a digital processor for controlling the operation of said dispenser;

means for connecting said plurality of money order dispensers to said data collector.

* * * * *